United States Patent
Sinha et al.

(10) Patent No.: US 10,318,743 B2
(45) Date of Patent: Jun. 11, 2019

(54) METHOD FOR RANSOMWARE IMPACT ASSESSMENT AND REMEDIATION ASSISTED BY DATA COMPRESSION

(71) Applicant: McAfee, Inc., Santa Clara, CA (US)

(72) Inventors: Bidan Sinha, Santa Clara, CA (US); Arun Chundiriyil Pullat, Santa Clara, CA (US); Arpit Pradhan, Santa Clara, CA (US); German Lancioni, Cordova (AR); Priyadarshini Rao Rajan, Palo Alto, CA (US); Cedric Cochin, Portland, OR (US); Craig Schumgar, Hillsboro, OR (US)

(73) Assignee: McAfee, LLC, Santa Clara, CA (US)

( * ) Notice: Subject to any disclaimer, the term of this patent is extended or adjusted under 35 U.S.C. 154(b) by 195 days.

(21) Appl. No.: 15/392,848

(22) Filed: Dec. 28, 2016

(65) Prior Publication Data

US 2018/0181761 A1   Jun. 28, 2018

(51) Int. Cl.
*G06F 21/57* (2013.01)
*G06F 21/56* (2013.01)
*H04L 29/06* (2006.01)

(52) U.S. Cl.
CPC ............ *G06F 21/577* (2013.01); *G06F 21/56* (2013.01); *G06F 21/565* (2013.01); *G06F 21/568* (2013.01); *H04L 63/12* (2013.01); *H04L 63/145* (2013.01); *H04L 63/1433* (2013.01)

(58) Field of Classification Search
CPC .................................................. G06F 21/577
USPC ........................................................ 726/23
See application file for complete search history.

(56) References Cited

U.S. PATENT DOCUMENTS

| 8,438,644 B2 * | 5/2013 | Watters ................. G06F 21/577 |
| | | 705/51 |
| 2016/0012235 A1 * | 1/2016 | Lee ..................... G06Q 10/0635 |
| | | 726/25 |

OTHER PUBLICATIONS

International Searching Authority, "Search Report and Written Opinion,", issued in connection with PCT patent application No. PCT/US2017/068645, dated Apr. 3, 2018, 20 pages.
Adam Alessandrini, "Ransomware Hostage Rescue Manual," Apr. 18, 2016, retrieved from [https://web.archive.org/web/20160418075950/https://www.wired.com/wp-content/uploads/2016/03/RansomwareManual-1.pdf] on Mar. 22, 2018, 20 pages.
Amelio Vasquez-Reina: "Tar + rsync + untar. Any speed benefit over just rsync?," Dec. 13, 2016, retrieved from [https://web.archive.org/web/20161213175123/https://unix.stackexchange.com/questions/30953/tar-rsync-untar-any-speed-benefit-over-just-rsync] on Mar. 22, 2018, 6 pages.

(Continued)

*Primary Examiner* — Jacob Lipman
(74) *Attorney, Agent, or Firm* — Hanley, Flight and Zimmerman, LLC

(57) ABSTRACT

Assessing ransomware impact includes receiving an indication of a first plurality of files stored on a user device and a classification for each of the first plurality of files, determining a second plurality of files stored in a remote storage, wherein the second plurality of files corresponds to an indication of files stored on the user device at a first prior time, wherein each of the second plurality of files are associated with a second classification, determining a third plurality of files comprising files included in the first plurality of files and not included in the second plurality of files, and calculating a risk assessment based on classifications for each of the third plurality of files.

20 Claims, 6 Drawing Sheets

(56) References Cited

OTHER PUBLICATIONS

Anonymous, "Tar Computing," Jul. 1, 2016, retrieved from the internet at [https://web.archive.org/web/2016070100/0000*/https://en.wikipedia.org/w;ki/Tar_(computing)] on Mar. 22, 2018, 10 pages.

Bryan Betts, "Shadow data and the risks posed by cloud storage and apps," ComputerWeekley.com.com, Jun. 14, 2016, retrieved from [https://www.computerweekly.com/news/450298345/Shadow-data-and-the-risks-posed-by-cloud-storage-and-apps] on Mar. 12, 2018, 4 pages.

Keke Gai et al., "Secure cyber incident analytics framework using Monte Carlo simulations for financial cybersecurity insurance in cloud computing," Summary available only, published May 27, 2016, retrieved from [https://onlinelibrary.wiley.com/doi/full/10.1002/cpe.3856] on Jun. 20, 2018, 1 page.

Paul Mah, "Synology DSM 6.0 for protecting your business data," Nov. 7, 2016, retrieved from [https://web.archive.org/web/20161107040514/http://www.techblogger.io/2016/03/synology-dsm-6-0-for-protecting-your-business-data/] on Mar. 22, 2018, 9 pages.

Nayan B. Ruparelia, "Cloud computing," Cloud computing, MIT Press, ISBN:978-0-262-52909-9, May 31, 2016, pp. 240-241.

Xiaosong Ma, "On the Feasibility of Data Loss Insurance for Personal Cloud Storage," Qatar Computing Research Institute, xma@af.org.qa, 5 pages.

* cited by examiner

METHOD FOR RANSOMWARE IMPACT ASSESSMENT AND REMEDIATION ASSISTED BY DATA COMPRESSION

TECHNICAL FIELD

Embodiments described herein generally relate to cloud file storage and in particular to techniques for assessing ransomware impact and remediation assisted by cloud storage.

BACKGROUND ART

"Ransomware," which is malware that encrypts user files and requires users to pay for release of the decryption key, is an increasingly successful tactic used by cybercriminals. It is effective because malware protection typically relies on identification through signature and removal of infection. Recovery of data becomes impossible in the case of a new malware variant that is not identified in time on a user's device.

Though better detection methods can be applied to endpoints such as personal computers, in the case of cloud storage systems, blind acceptance of the changes made to cloud stored data by authorized (but infected) endpoints means that an infection can propagate changes and destroy both local and cloud stored data. Users lose both their local data and cloud backups, forcing them to make a deal with cybercriminals to regain access to their personal data, pictures etc.

Thus, in the case of ransomware attacks, it may not be immediately clear to a user what value to place on files which may not be recoverable.

DESCRIPTION OF EMBODIMENTS

Figure 1:
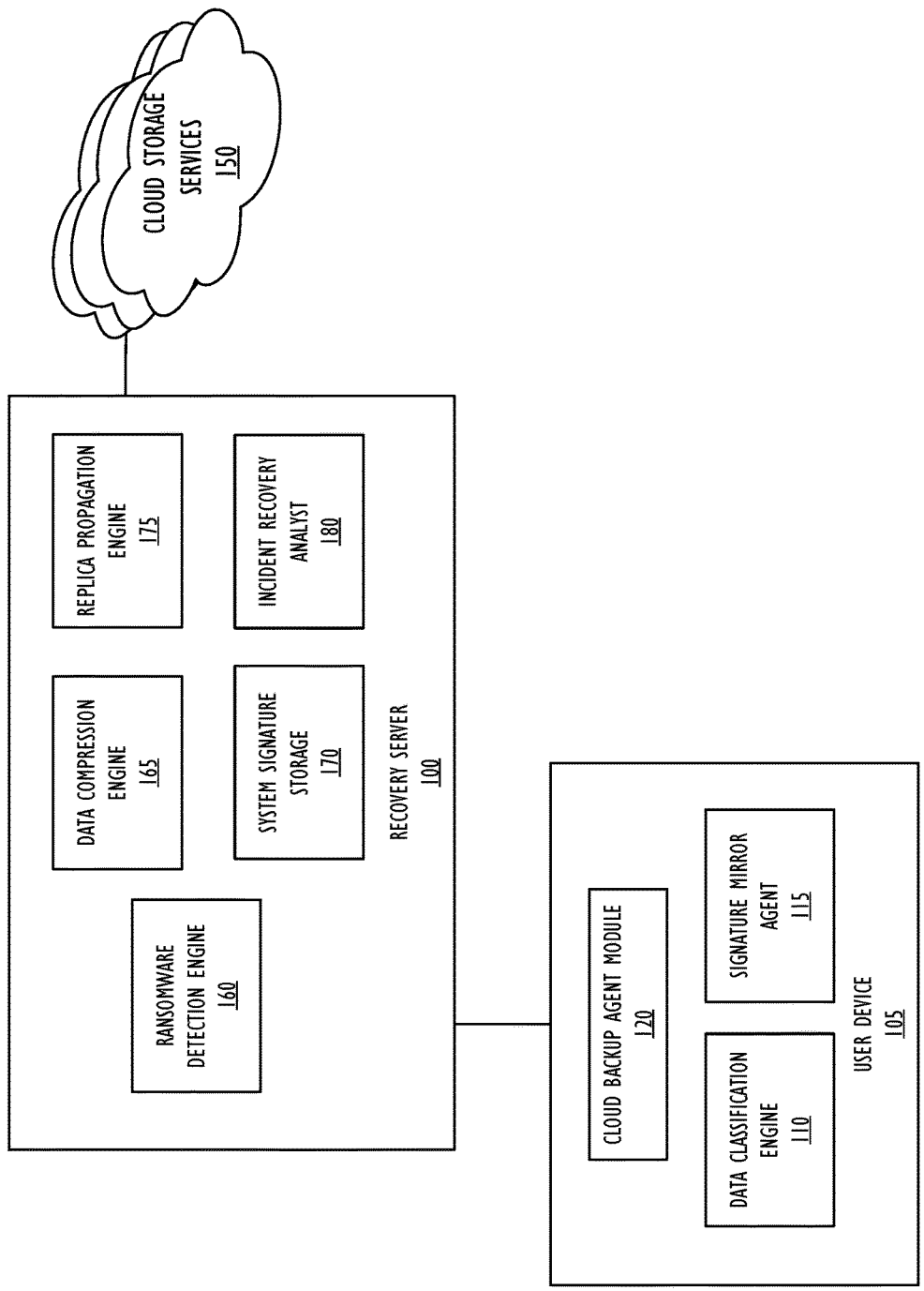
FIG. 1 is a block diagram illustrating an improved system for assessing impact of ransomware according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein, the term "cloud storage" is a model of data storage in which digital data is stored in logical pools, the physical storage spans multiple servers (and often, locations), and the physical environment is typically owned and managed by a hosting company that provides services to many different entities. However, cloud storage may be provided in a private cloud, where the cloud infrastructure is operated solely for a single organization, whether managed internally or by a third party, and hosted either internally or externally to the organization. Hybrid clouds may combine private and non-private cloud resources. Cloud storage often involves mapping the cloud storage to a local drive, allowing the user to see and use the cloud storage using operating system native interfaces as if the remote cloud storage were a local drive. However, cloud storage may also interface with the user through a non-native interface, such as those provided by document management systems, that provides functionality different from a native operating system interface.

The techniques described below provide the capability to assess the value of data which may not be retrievable from denial of access to that data.

A practical example of the value of these techniques is recent press re the ransomware "cryptolocker" in which claims are made that cryptolocker targeted data stored in the Google Drive™ service. (GOOGLE DRIVE is a trademark of Google, Inc.; GOOGLE is a registered trademark of Google, Inc.) In reality, the fault lies with the Google Drive replication tool (desktop Google Drive) which seamlessly replicates local file changes to the Google® cloud storage. In these cases, cryptolocker encrypts the local Google Drive folder, and Google Drive transmits those changes to the cloud, thus removing the possibility of recovering the files unless prior versions are available.

Briefly, techniques described below allow a user to determine which files are recoverable in case of a malware attack, such as a ransomware attack. A relative recovery value may be assigned to user files and a signature may be generated prior to utilizing cloud storage to back up user files stored locally on a user device. Further, a user interface may be provided to allow the user to customize how files are replicated and stored in cloud storage. In one or more embodiments, certain techniques may be employed to optimize cloud storage of replications. For example, the replicated set of files from the user device may be optimized prior to being stored remotely. As an example, the replicated files may be compressed. Further, according to one or more embodiments, the user may be provided with an interface indicating how valuable the files are that are not recoverable. According to one or more embodiments, the system compares system snapshots stored in cloud storage at various times to monitor the remediation efficiency at any given time.

FIG. 1 is a block diagram illustrating a system in which a recovery server 100 may perform an analysis and provide an impact assessment of ransomware attacks to a user, according to one embodiment. A user at user device 105 may occasionally back up locally stored files across one or more cloud storage services 150. In one or more embodiments, recovery server 100 may manage the distribution of replicas of the user device files across cloud storage services 150.

User device 105 may be any kind of programmable device that may access cloud storage, including mobile devices such as mobile phones and tablets, desktop computers, and laptop computers. A single user device 105 is illustrated in FIG. 1 for clarity, but cloud storage providers typically have millions of subscribers to the cloud storage service, any of which could have the local devices be infected by ransomware. Further, recovery server 100 may provide recovery analysis and other services to any number of user devices.

User device 105 includes multiple components that facilitate in cloud storage backup. Data classification engine 110 may determine a relative value for files stored on the user device 105. According to one or more embodiments, the data classification engine 110 may assign a relative replacement value to files. Thus, data classification engine 110 may intelligently classify data into various relative value classifications. The determination may be made based on multiple characteristics and, in one or more embodiments, may be determined based, in part, on a user's behavior with respect to the files. For example, value may be determined based on the uniqueness or reproducibility of the file. That is, a document that is written by a user or a photo taken by a user is unique. However, music or movie files purchased over the web may be easily replaced. As another example, operating system and application files are easily replaceable. Thus, a context of the file may be considered. Another technique that may be utilized for determining a relative value classification is utilizing the significance of the files. For example, a document with a list of passwords or documents containing a user's personal information, may not necessarily be unique or irreplaceable, but may be of high value. Thus, the value classification may consider content of the file. Another technique may be considering how resource intensive files are. For example, an image may be smaller than a video, but a video that is uploaded to a video sharing service may be replaced by a link to the uploaded video. Any of these considerations may be used in combination. For example, uniqueness, importance, and static attributes may be given weighted values to determine a priority of a file. Downloaded wallpaper may be of low importance and low uniqueness, whereas a photograph from a local camera may be of high importance and medium uniqueness. A user interface may also be provided such that a user may determine how to weight the various considerations for determining a relative value. Further, the user interface may allow a user to provide a value classification for any file or set of files.

User device 105 may also include a signature mirror agent 115. The signature mirror agent 115 may maintain snapshots of local data on the user device 105 over time. It may not be sufficient to maintain a single snapshot of the data stored on the user device 105 at a particular time. Rather, it may be beneficial to maintain information regarding data stored on the user device 105 over several points in time. By saving multiple snapshots of data stored on user device 105, the built-in latency allows for recovery from multiple points in time. Thu, the signature mirror agent 115 may maintain the state information of data stored in user device 105, and a difference between data stored on user device 105 at different points in time.

User device 105 may also include a cloud backup agent module 120. According to one or more embodiments, the cloud backup agent module 120 may provide a cloud storage API to provide an interface for reading, writing, creating, and deleting of files in the cloud storage system. File activity typically traverses one or more networks, which may be any number of interconnected networks of any type, to reach a cloud storage service 150. Cloud storage service 150 may include one or more cloud storage servers. The cloud storage service 150 may use its own cloud storage API to store user file data in a file store database. According to one or more embodiments, consecutive images of the data of user device 105 may be stored to different cloud services. In some embodiments, the user may not direct or even be aware of which cloud services are used. Thus cloud backup agent module 120 may manage sending backup files to one or more cloud storage services 150. According to one or more embodiments, cloud backup agent module 120 may also perform some data compression, which may optimize the usage of network bandwidth for backups. As an example, when possible, a file may be replaced with a link to where the file may be retrieved. Some embodiments may provide the user the ability to configure which cloud services are used, whether files can be replaced with links, etc.

Recovery server 100 may additionally include a number of modules. For example, a ransomware detection engine 160 may interact with the cloud backup agent module 120 to intercept user file activity, detect and prevent possible ransomware attacks, and offer remediation to the user. The ransomware detection engine 160 may serve as an intermediary, which the cloud backup agent module 120 may utilize to store data on third-party cloud storage server 150. In some embodiments, the ransomware detection engine 160 hooks into a cloud storage API on the cloud storage server 150, using any desired hooking technique. Any other technique for allowing the ransomware detection engine 160 to interact with the cloud storage service 150 may be used. In one embodiment, the ransomware detection engine 160 may monitor for behavior indicating ransomware by examining the data accompanying an API call and comparing it to the current data stored for an entry. The following are examples of behavior that may suggest ransomware:

(a) Overwriting existing data with significantly different content, such as a highly different hash map. Most updates to cloud services are partial file writes, not complete same-name data replacement).

(b) Overwriting existing low entropy data with high entropy data, which may indicate encryption of unencrypted user "files."

As indicated above, some embodiments may optionally augment the data collection by installing an agent on the user device 105 to obtain user context. For example, the agent may:

(a) Determine whether the communication with a cloud storage API is related to local files, or direct cloud API interaction;

(b) Determine whether a cloud storage API calls originate from the local machine or from elsewhere, which may indicate a cloud storage account credential compromise;

(c) Act as a mechanism to alert the user of activity and seek instruction as to whether to allow/block the activity; or (d) Offer the user of user device 105 an opportunity to recover files potentially corrupted by the ransomware activity.

The ransomware detection engine 160 may employ monitoring rules for filtering read, delete, write sequences, as well as delete, write sequences, to identify situations where the activity is due to replication of local files, or is the result of direct manipulation of the cloud storage API.

Recovery server 100 may also include a data compression engine 165. According to one or more embodiments, data compression engine 165 may determine an optimal approach to compressing and storing data depending on its value and cost to store, as well as the total storage available to the user. The cost of storage may be defined in terms of resources required to store the data, or a monetary value to store the data, for example, if a user must pay for extra storage. For example, the data compression engine 165 may determine that it is not necessary to backup files which are duplicates of other stored files, or those which may be replaced by a link to an external source, such as a website. In addition, the data compression engine 165 may optimize compression based on available storage and relative value classifications as assigned by prioritizing files with a high value. As an example, high value data, with relatively low cost of storage may require a high level of redundancy, so high value data may be stored using strong data encryption and redundant storage. By contrast, low value data with a relatively high cost of storage may not require high redundancy. Media may be uploaded to a third party repository and replaced with links, or replaced with lower-quality versions of the media. Further, some types of files may not need to be backed up if they are available elsewhere. As an example, application files or operating system files are often provided through a third party.

Recovery server 100 may also include a system signature storage 170. According to one or more embodiments, system signature storage may preserve historical records of the state of evolution of the user's data across multiple timestamps, as well as information on how the user data is stored on cloud storage providers. As an example, system signature storage 170 may include a snapshot of data on user device 105, along with a timestamp associated with the snapshot, and information regarding where among cloud storage services 150 the data is stored. According to one or more embodiments, the signature store may be utilized by the incident recovery analyst 180 (described below) to determine what data is lost and what is recoverable.

According to one or more embodiments, recovery server 100 may also include a replica propagation engine 175. Replica propagation engine 175 may serve as a throttling mechanism, propagating data to third-party cloud storage services 150. By throttling which cloud storage services 150 are used for various snapshots of data, propagation of ransomware into all the cloud storage services 150 may be prevented. For example, if three cloud storage services 150 are employed, data from a first snapshot may be stored by a first cloud storage service 150, and data from a second snapshot may be stored in a second cloud storage service 150. Thus, the built-in latency between replicas of the data from the user device 105 being propagated into cloud storage services 150 allows for opportunities to recover data even if one or more of the cloud storage services 150 have been corrupted by ransomware or other malware.

Recovery server 100 may also include an incident recovery analyst 180. According to one or more embodiments, the incident recovery analyst 180 may analyze and predict the impact of a ransomware attack. According to one or more embodiments, the incident recovery analyst 180 may analyze the impact of a ransomware attack in response to the detection of a ransomware attack, such as by ransomware detection engine 160. Alternatively, or in addition, the incident recovery analyst 180 may provide a report to a user regarding a potential impact of a ransomware attack at any given time. In one or more embodiments, incident recovery analyst 180 may employ a user interface provided through user device 105 that may allow a user to request an impact report at any given time. Further, according to one or more embodiment, the user interface may allow a user to select various scenarios by which an impact should be assessed. For example, the user may select whether one or more cloud storage services 150 have been compromised, either because of knowledge of a compromise or as part of a what-if analysis. In one or more embodiments, the user may additionally utilize the user interface to adjust priorities regarding how the data is backed up in cloud storage services 150. According to one or more embodiments, incident recovery analyst 180 may utilize the information from the snapshots stored in system signature storage 170, along with the value classifications for the various files as provided by data classification engine 110. In one or more embodiments, incident recovery analyst 180 may additionally provide some remediation services. As an example, incident recovery analyst 180 may inform a user of data that has been lost in the event of an attack and allow the user to initiate a recovery utilizing the various replicas stored in cloud storage services 150. In addition, incident recovery analyst 180 may provide a relative value for the files that are not recoverable so that the user may make an informed decision regarding whether to pay a ransomware vendor or take other steps, if necessary.

The various modules and other components are depicted in different systems and subsystems for purposes of clarity. However, in one or more embodiments, the various modules or other components may be arranged in other ways in different systems. Further, the functionality of the various components may be combined or differently distributed, according to one or more embodiments.

Figure 2:
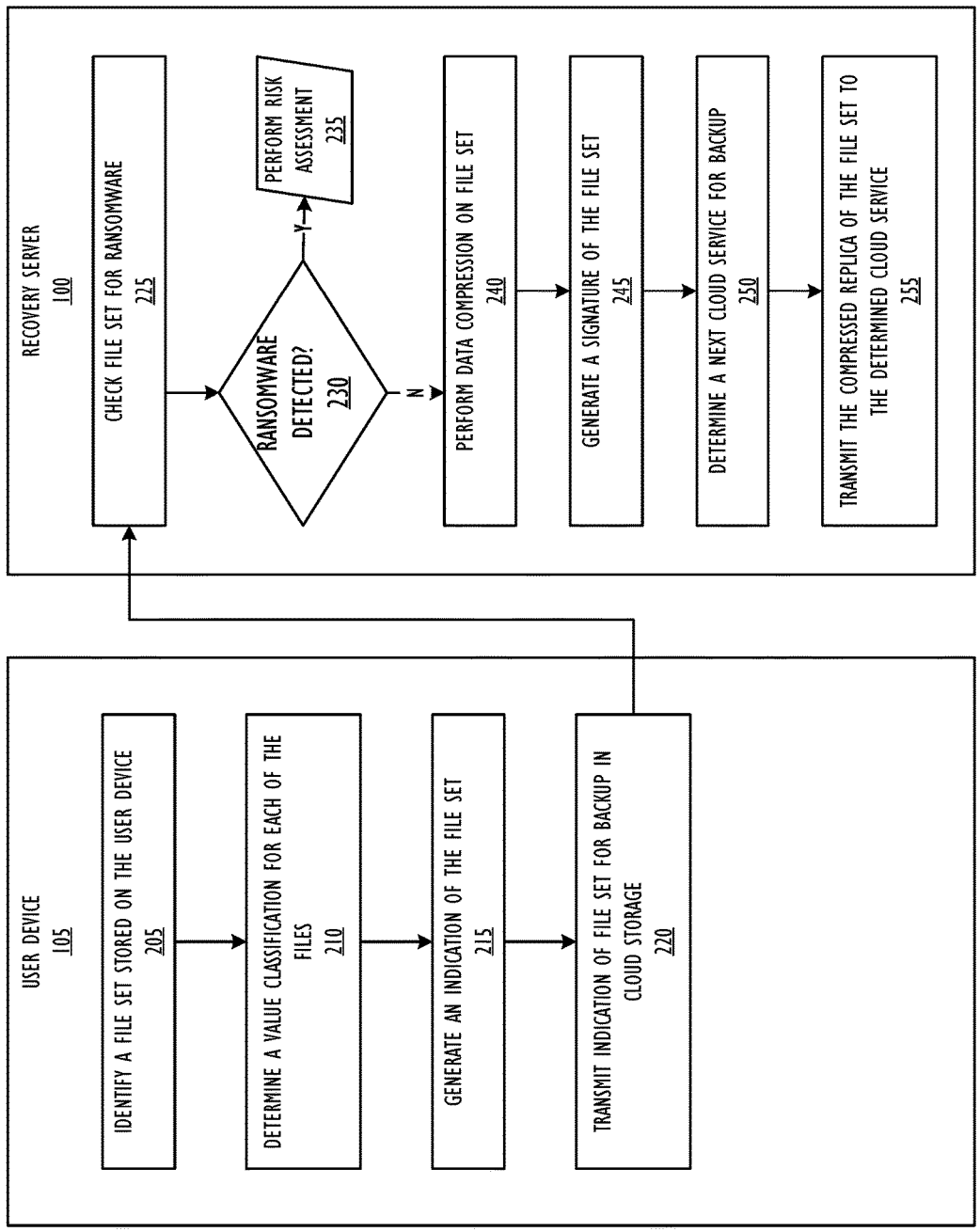
FIG. 2 is a flowchart illustrating a technique for utilizing cloud storage for protection against ransomware according to one embodiment.

FIG. 2 is a flowchart illustrating a technique for utilizing cloud storage for protection against ransomware according to one embodiment. The flowchart begins at 205, and set of files is identified as stored on the user device 105. At 210, a value classification for each of the files is determined. As described above, the data classification engine 110 may classify the data in any number of ways. For example, the data classification engine may determine a classification value for each file based on user behavior with the file. As another example, the data classification engine may determine a classification for each file based on uniqueness or significance of the content of the file.

The flowchart continues at 215, where the signature mirror agent 115 generates an indication of the file set. According to one or more embodiments, the indication of the file set may be the entire set of files, or may be an optimized version of the file set. For example, the signature mirror agent 115 may perform data compression on the set of files. Further, other kinds of optimization may be completed. As an example, files that are replaceable online may be replaced by links, or duplicates of files may be purged. Thus, the indication of the file set may include at least an indication of the files stored in the user device 105. Further, the indication of the file set may also include a timestamp identifying the time at which the files were identified as being stored on the user device 105. In one or more embodiments, the indication of the first file set may also include the classification values for the files.

At 220, the cloud backup agent module 120 transmits the indication of the file set for backup by cloud storage services 150, according to one or more embodiments. In one or more embodiments, the indication of the file set may be transmitted periodically, or occasionally. The method continues at 225, and the ransomware detection engine 160 checks the file set for ransomware. In one or more embodiments, the ransomware detection engine 160 may monitor for ransomware using a number of ways. For example, according to one or more embodiments, the ransomware detection engine 160 may monitor function calls for patterns that are not likely to be normal user activity.

At 230, a determination is made regarding whether ransomware is detected. If ransomware is detected, then the flowchart continues at 235, and a risk assessment is performed. The risk assessment is described in greater detail below, with respect to blocks 315-340 of FIG. 3. If, at 230, it is determined that ransomware is not detected in the file set, then the flowchart continues at 240, and data compression engine 165 performs data compression on the file set. According to one or more embodiments, the data compression may be similar to that described above with respect to 215. Further, in one or more embodiments, additional optimization may be performed. As an example, some files, such as media, may be uploaded to a third party host, and replaced with a link or a smaller version of the file, such as a thumbnail or preview.

The flowchart continues at 245 and the system signature storage generates a signature of the file set. According to one or more embodiments, the system signature storage may manage historical records of the state of evolution of the data stored on user device 105 across multiple timestamps. At 250, a next cloud service is determined for backup. In one or more embodiments, the cloud storage service 150 utilized to store a replica may vary over time such that consecutive replicas are backed up by different cloud storage services 150. By managing the propagation of replicas to different cloud storage services over time, there is a built in latency that may be exploited in order to recover user files from different points in time. The flowchart concludes at 255, where the replica propagation engine transmits the file set to the determined cloud storage service 150.

Figure 3:
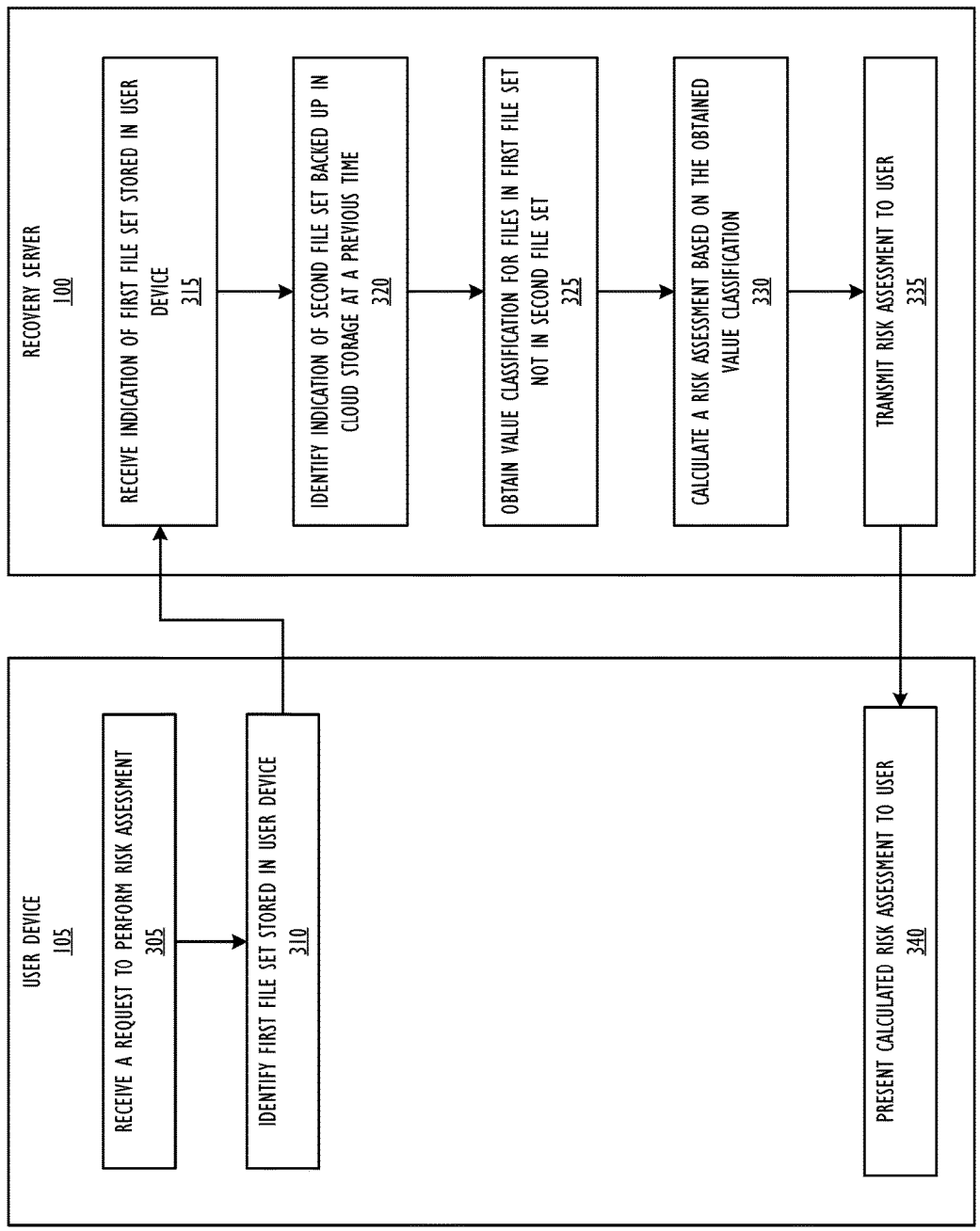
FIG. 3 is a flowchart illustrating a technique for assessing potential impact of ransomware according to one or more embodiments.

FIG. 3 is a flowchart illustrating a technique for assessing potential impact of ransomware according to one or more embodiments. The flowchart begins at 305, and a request to perform risk assessment is received at the user device 105. In one or more embodiments, the request may be received via a user interface. According to one or more embodiments, the user interface may additionally allow a user to enter various scenarios to view the impact of various types of malware attack. For example, the user may request a risk assessment that is based on a ransomware attack, and may indicate various levels of attack. That is, a user may request a risk assessment for a situation in which the user device 105 is attacked, or where one or more of cloud storage devices are attacked, such as if the ransomware were propagated from user device 105 into cloud storage service 150 during a backup operation.

At 310, the signature mirror agent 115 identifies a first file set stored in the user device 105. In one or more embodiments, the signature mirror agent 115 may determine an indication of the files currently stored on user device 105. The current file set may be processed by the data classification engine 110 and the cloud backup agent module 120, according to one or more embodiments. Thus, in one or more embodiments, the files may be optimized and/or assigned classification values indicating a relative value of the files.

The flowchart continues at 315, and the recovery server 100 receives the indication of the first file set stored in the user device. At 320, the incident recovery analyst 180 identifies an indication of a second file set backed up by cloud storage service 150 at a previous time. In one or more embodiments, the incident recovery analyst 180 consults the system signature storage 170 to determine a set of files that are in the latest file set from the user device 105, and a file set previously backed up to cloud storage services 150. The difference may be determined by the historical snapshots stored in system signature storage 170. The flowchart continues at 325 and value classifications are obtained for files that are in the first file set and not the second file set. According to one or more embodiments, the system signature storage may include the value classifications for the files. In one or more embodiments, the value classifications may have been assigned by data classification engine 110 in user device 105.

At 330, the incident recovery analyst 180 calculates a risk assessment based on the obtained value classification. In one or more embodiments, the risk assessment may indicate a total calculated risk of loss based on files not backed up. Further, the risk assessment may provide additional metrics calculated by the incident recovery analyst 180. As an example, incident recovery analyst 180 may determine how many or what percentage of each type of file (e.g., documents, photos, videos, etc.) are recoverable or not, or how many or what percentage of each classification of file are recoverable, such as sensitive documents, original photos, and the like. At 335, the incident recovery analyst 180 transmits the risk assessment to the user. The flowchart concludes at 340, and the user device 105 presents the calculated risk assessment to the user. According to one or more embodiments, when the user sees the risk assessment, the user may be provided an opportunity to manage the risk in a number of ways. For example, the user may adjust priorities for which files should be backed up. As another example, the user may increase or reduce an amount of cloud storage dedicated to backup services.

The techniques described above provide improvements over existing cloud storage solutions. For example, because cloud storage systems current cannot recognize ransomware attacks on the files maintained by the cloud storage system, after-the-fact recovery is limited to restoration of files from backups and versioning. In many cases, no recovery is available, because no detection is made until some time after the ransomware has encrypted the files stored by the cloud service provider. Further, users are often unable to determine which files are recoverable and which are not. By managing replicas across multiple cloud storage providers and tracking historical changes in user data, system may provide a user with better information in order to mitigate ransomware attacks and consequences.

By comparing system snapshots with data available in cloud backup system, the analysis may provide a way to monitor the remediation efficiency at any moment. At the same time, the system may allow users to understand how files are being backed up and will be available during an eventual remediation effort, and provide options to increase coverage of files which the system, or the user, may deem valuable.

Figure 4:
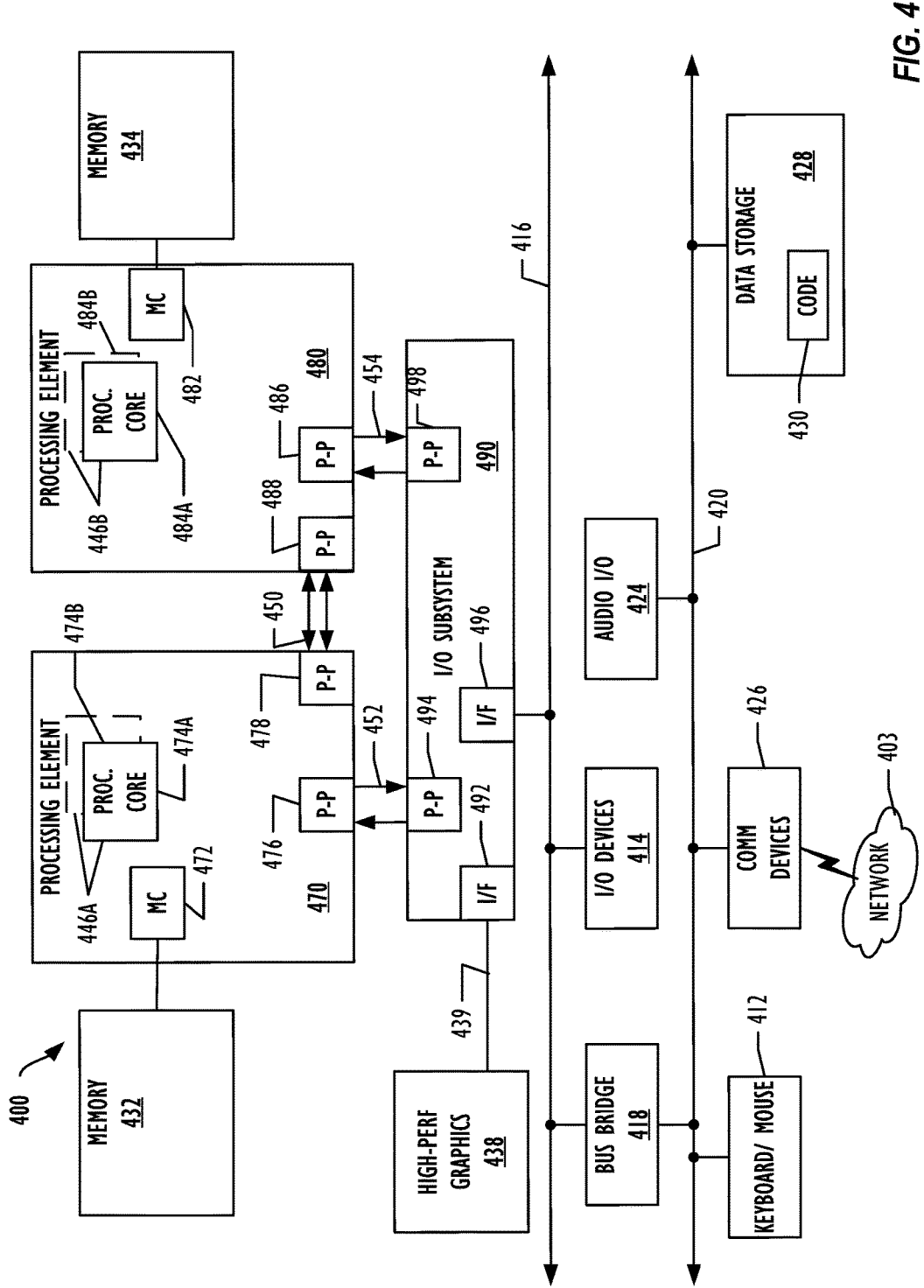
FIGS. 4-5 are a block diagrams illustrating programmable devices for use with techniques described herein according to two embodiments.

Referring now to FIG. 4, a block diagram illustrates a programmable device 400 that may be used for implementing the techniques described herein in accordance with one embodiment. The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute instruction code. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., instructions) that are utilized by one or more components of the processing element, such as the cores 474a, 474b and 484a, 484b, respectively. For example, the shared cache may locally cache data stored in a memory 432, 434 for faster access by components of the processing elements 470, 480. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

Figure 5:
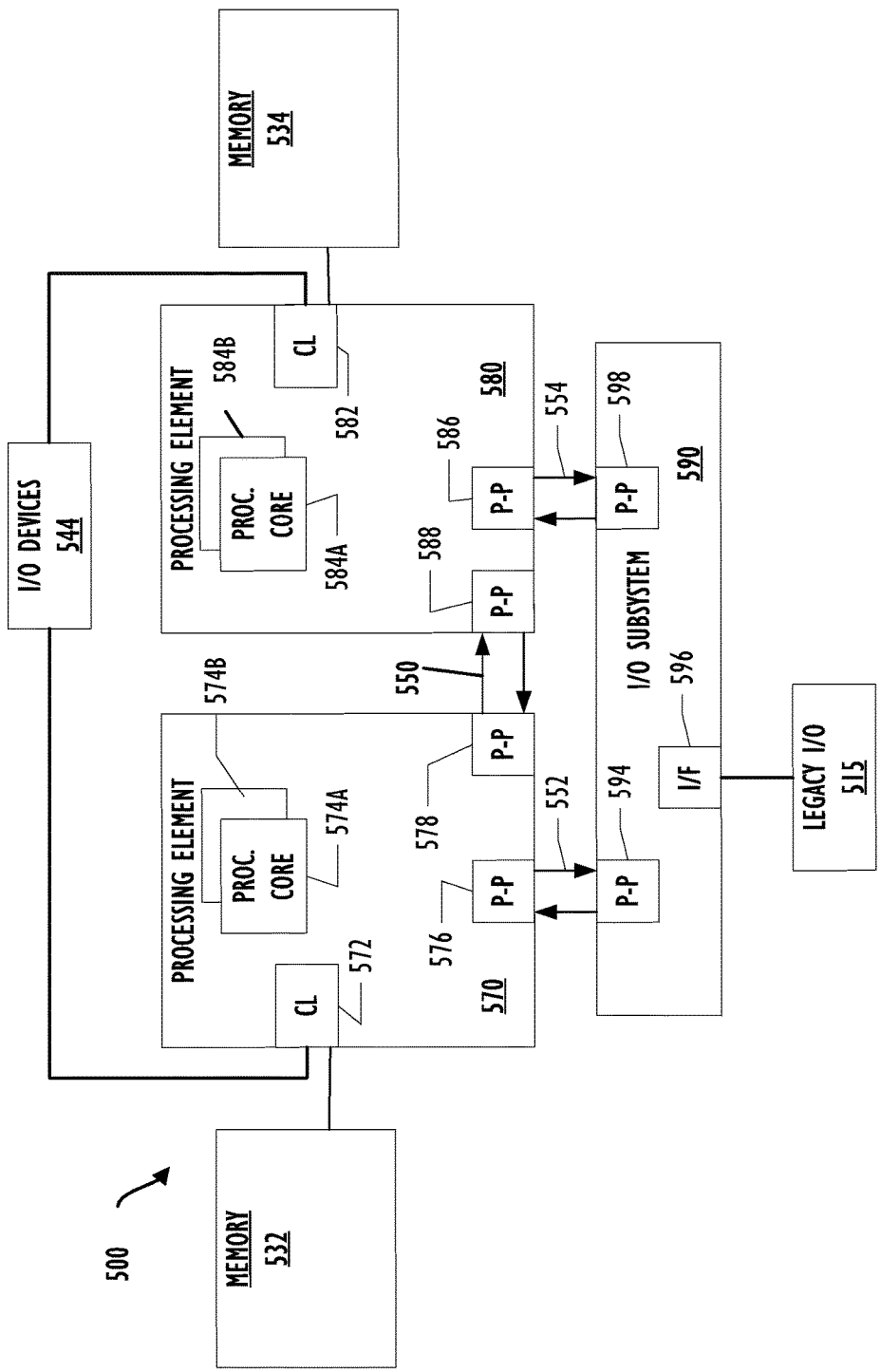

Referring now to FIG. 5, a block diagram illustrates a programmable device 500 according to another embodiment. Certain aspects of FIG. 5 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the 572, 582 may include memory control logic (MC) such as that described above in connection with FIG. 3. In addition, CL 572, 582 may also include I/O control logic. FIG. 5 illustrates that not only may the memories 532, 534 be coupled to the CL 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively.

The programmable devices depicted in FIGS. 4 and 5 are schematic illustrations of embodiments of programmable devices that may be utilized to implement various embodiments discussed herein. Various components of the programmable devices depicted in FIGS. 4 and 5 may be combined in a system-on-a-chip (SoC) architecture.

Figure 6:
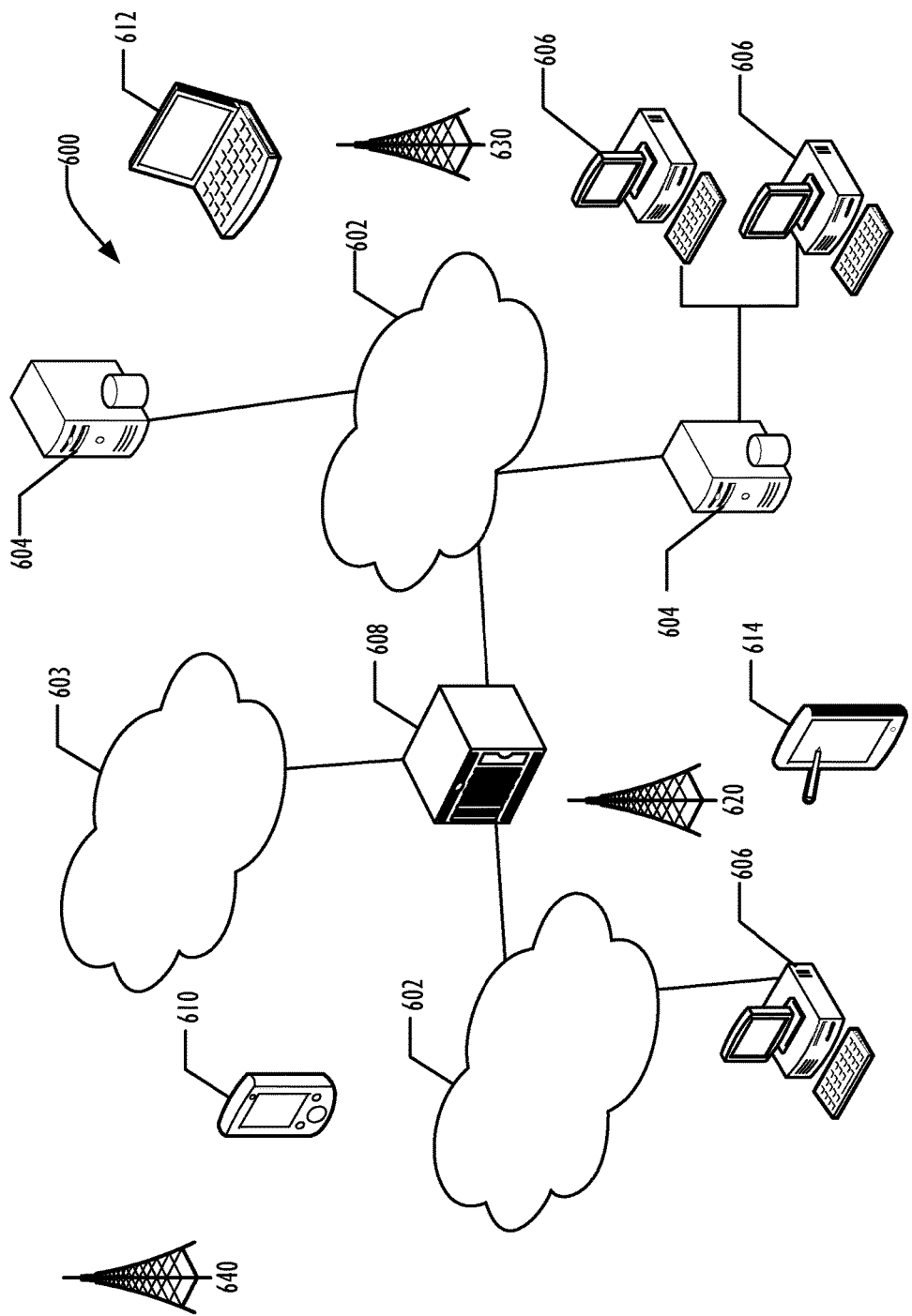
FIG. 6 is a block diagram illustrating a network of programmable devices according to one embodiment.

Referring now to FIG. 6, an example infrastructure 600 in which the techniques described above may be implemented is illustrated schematically. Infrastructure 600 contains computer networks 602. Computer networks 602 may include many different types of computer networks available today, such as the Internet, a corporate network or a Local Area Network (LAN). Each of these networks can contain wired or wireless programmable devices and operate using any number of network protocols (e.g., TCP/IP). Networks 602 may be connected to gateways and routers (represented by 608), end user computers 606, and computer servers 604.

Infrastructure 600 also includes cellular network 603 for use with mobile communication devices. Mobile cellular networks support mobile phones and many other types of mobile devices. Mobile devices in the infrastructure 600 are illustrated as mobile phones 610, laptops 612 and tablets 614. A mobile device such as mobile phone 610 may interact with one or more mobile provider networks as the mobile device moves, typically interacting with a plurality of mobile network towers 620, 630, and 640 for connecting to the cellular network 603. Although referred to as a cellular network in FIG. 6, a mobile device may interact with towers of more than one provider network, as well as with multiple non-cellular devices such as wireless access points and routers 608. In addition, the mobile devices 610, 612 and 614 may interact with non-mobile devices such as servers 604 and 606 for desired services The servers 604 in this scenario represent cloud storage service providers, allowing endpoint devices such as the end user computers 606 and mobile devices 610, 612 and 614 to store files in the cloud storage servers 604 safely, with less risk that files stored by the cloud storage servers 604 may be encrypted by ransomware attacks on the end user computers 606 and mobile devices 610, 612 and 614.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a computer readable medium storing software for assessing ransomware impact, comprising instructions that when executed cause one or more processors to: receive an indication of a first plurality of files stored on a user device and a classification for each of the first plurality of files; determine a second plurality of files stored in a remote storage, wherein the second plurality of files corresponds to an indication of files stored on the user device at a first prior time, wherein each of the second plurality of files are associated with a second classification; determine a third plurality of files comprising files included in the first plurality of files and not included in the second plurality of files; and calculate a risk assessment based on a third classification for each of the third plurality of files.

In Example 2 the subject matter of Example 1 optionally includes wherein the risk assessment is calculated in response to detecting a ransomware attack.

In Example 3 the subject matter of Example 1 optionally includes further comprising computer readable code to: provide the risk assessment to a user of the user device.

In Example 4 the subject matter of any of Examples 1-3 optionally includes wherein the third classification of the third plurality of files indicates a relative recovery value of the third plurality of files.

In Example 5 the subject matter of any of Examples 1-3 optionally includes wherein the instructions to calculate the risk assessment further comprises instructions that cause the one or more processors to: determine that the second plurality of files are corrupt; in response to determining that the second plurality of files are corrupt, identifying a fourth plurality of files corresponding to an indication of files stored on the user device at a second prior time; and calculating the risk assessment further based on classifications for each of the first plurality of files not included in the fourth plurality of files.

In Example 6 the subject matter of Example 5 optionally includes wherein the second plurality of files are hosted by a first cloud storage service, and wherein the fourth plurality of files are hosted by a second cloud storage service.

Example 7 is a method for improving assessment of ransomware impact, comprising: receiving an indication of a first plurality of files stored on a user device and a classification for each of the first plurality of files; determining a second plurality of files stored in a remote storage, wherein the second plurality of files corresponds to an indication of files stored on the user device at a first prior time, wherein each of the second plurality of files are associated with a second classification; determining a third plurality of files comprising files included in the first plurality of files and not included in the second plurality of files; and calculating a risk assessment based on classifications for each of the third plurality of files.

In Example 8 the subject matter of Example 7 optionally includes wherein the risk assessment is calculated in response to detecting a ransomware attack.

In Example 9 the subject matter of Example 7 optionally includes further comprising: providing the risk assessment to a user of the user device.

In Example 10 the subject matter of any of Examples 7-9 optionally includes wherein the third classification of the third plurality of files indicates a relative recovery value of the third plurality of files.

In Example 11 the subject matter of any of Examples 7-9 optionally includes wherein calculating the risk assessment further comprises: determining that the second plurality of files are corrupt; in response to determining that the second plurality of files are corrupt, identifying a fourth plurality of files corresponding to an indication of files stored on the user device at a second prior time; and calculating the risk assessment further based on classifications for each of the first plurality of files not included in the fourth plurality of files.

In Example 12 the subject matter of Example 11 optionally includes wherein the second plurality of files are hosted by a first cloud storage service, and wherein the fourth plurality of files are hosted by a second cloud storage service.

Example 13 is a system for assessing ransomware impact, comprising: one or more processors; and a memory coupled to the one or more processors and comprising instructions executable by the one or more processors to cause the system to: receive an indication of a first plurality of files stored on a user device and a classification for each of the first plurality of files; determine a second plurality of files stored in a remote storage, wherein the second plurality of files corresponds to an indication of files stored on the user device at a first prior time, wherein each of the second plurality of files are associated with a second classification; determine a third plurality of files comprising files included in the first plurality of files and not included in the second plurality of files; and calculate a risk assessment based on classifications for each of the third plurality of files.

In Example 14 the subject matter of Example 13 optionally includes wherein the risk assessment is calculated in response to detecting a ransomware attack.

In Example 15 the subject matter of Example 13 optionally includes further comprising instructions to cause the system to: provide the risk assessment to a user of the user device.

In Example 16 the subject matter of any of Examples 13-15 optionally includes wherein the third classification of the third plurality of files indicates a relative recovery value of the third plurality of files.

In Example 17 the subject matter of any of Examples 13-15 optionally includes wherein the instructions to calculate the risk assessment further comprise instructions that cause the system to: determine that the second plurality of files are corrupt; in response to determining that the second plurality of files are corrupt, identify a fourth plurality of files corresponding to an indication of files stored on the user device at a second prior time; and calculate the risk assessment further based on classifications for each of the first plurality of files not included in the fourth plurality of files.

In Example 18 the subject matter of Example 17 optionally includes wherein the second plurality of files are hosted by a first cloud storage service, and wherein the fourth plurality of files are hosted by a second cloud storage service.

Example 19 is a computer readable medium comprising instructions for improving risk assessment, executable by one or more processors to: identify a first plurality of files stored in a user device at a first time; determine a first value classification for each of the first plurality of files; generate an indication of the first plurality of files at the first time; and transmit, to a recovery server, the indication of the first plurality of files at the first time for backup storage.

In Example 20 the subject matter of Example 19 optionally includes further comprising instructions executable by one or processors to: request, from the recovery server, a risk assessment for current files stored on the user device; and receive the risk assessment from the recovery server, wherein the risk assessment indicates a determined value of current files stored on the user device that are not included in the first plurality of files based on a second value classification for each of the current files stored on the user device and not included in the first plurality of files.

In Example 21 the subject matter of Example 20 optionally includes further comprising instructions executable by the one or more processors to: display a user interface by which user input is received to request the risk assessment for current files stored on the user device.

In Example 22 the subject matter of any of Examples 19-20 optionally includes wherein the first value classification is based on a relative replacement value of each of the first plurality of files.

In Example 23 the subject matter of any of Examples 19-20 optionally includes wherein the value classification is based on a uniqueness of each of the first plurality of files.

In Example 24 the subject matter of any of Examples 19-20 optionally includes wherein the instructions to generate the indication of the first plurality of files at the first time comprises instructions executable by the one or more processors to: compress the first plurality of files; and store the compressed first plurality of files with a timestamp for the first time.

In Example 25 the subject matter of any of Examples 19-20 optionally includes wherein the instructions to determine the first value classification for each of the first plurality of files comprise instructions executable by the one or more processors to: assign the first value classification based on user behavior associated with each of the first plurality of files.

Example 26 is an apparatus for assessing ransomware impact, comprising: means for receiving an indication of a first plurality of files stored on a user device and a classification for each of the first plurality of files; means for determining a second plurality of files stored in a remote storage, wherein the second plurality of files corresponds to an indication of files stored on the user device at a first prior time, wherein each of the second plurality of files are associated with a second classification; means for determining a third plurality of files comprising files included in the first plurality of files and not included in the second plurality of files; and means for calculating a risk assessment based on a third classification for each of the third plurality of files.

In Example 27 the subject matter of Example 26 optionally includes wherein the risk assessment is calculated in response to detecting a ransomware attack.

In Example 28 the subject matter of Example 26 optionally includes further comprising: means for providing the risk assessment to a user of the user device.

In Example 29 the subject matter of any of Examples 26-28 optionally includes wherein the third classification of the third plurality of files indicates a relative recovery value of the third plurality of files.

In Example 30 the subject matter of any of Examples 26-28 optionally includes wherein the means for calculating the risk assessment further comprises: means for determining that the second plurality of files are corrupt; means for, in response to determining that the second plurality of files are corrupt, identifying a fourth plurality of files corresponding to an indication of files stored on the user device at a second prior time; and means for calculating the risk assessment further based on classifications for each of the first plurality of files not included in the fourth plurality of files.

In Example 31 the subject matter of Example 30 optionally includes wherein the second plurality of files are hosted by a first cloud storage service, and wherein the fourth plurality of files are hosted by a second cloud storage service.

Example 32 is an apparatus for improving risk assessment, comprising: means for identifying a first plurality of files stored in a user device at a first time; means for determining a first value classification for each of the first plurality of files; means for generating an indication of the first plurality of files at the first time; and means for transmitting, to a recovery server, the indication of the first plurality of files at the first time for backup storage.

In Example 33 the subject matter of Example 32 optionally includes further comprising: means for requesting, from the recovery server, a risk assessment for current files stored on the user device; and means for receiving the risk assessment from the recovery server, wherein the risk assessment indicates a determined value of current files stored on the user device that are not included in the first plurality of files based on a second value classification for each of the current files stored on the user device and not included in the first plurality of files.

In Example 34 the subject matter of Example 33 optionally includes further comprising: means for displaying a user interface by which user input is received to request the risk assessment for current files stored on the user device.

In Example 35 the subject matter of any of Examples 32-33 optionally includes wherein the first value classification is based on a relative replacement value of each of the first plurality of files.

In Example 36 the subject matter of any of Examples 32-33 optionally includes wherein the value classification is based on a uniqueness of each of the first plurality of files.

In Example 37 the subject matter of any of Examples 32-33 optionally includes wherein the means for generating the indication of the first plurality of files at the first time comprises: means for compressing the first plurality of files; and means for storing the compressed first plurality of files with a timestamp for the first time.

In Example 38 the subject matter of any of Examples 32-33 optionally includes wherein the means for determining the first value classification for each of the first plurality of files comprises: means for assigning the first value classification based on user behavior associated with each of the first plurality of files.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A computer readable medium storing software for assessing ransomware impact, comprising instructions that when installed and executed cause one or more processors to:

based on an identification of a ransomware attack, an indication of a first plurality of files stored on a user device, and a classification for each of the first plurality of files, determine a second plurality of files stored in a remote storage, wherein the second plurality of files corresponds to an indication of files stored on the user device at a first prior time, wherein each of the second plurality of files are associated with a second classification;

determine a third plurality of files including files included in the first plurality of files and not included in the second plurality of files;

calculate a risk assessment based on a third classification for each of the third plurality of files, the third classification formed based on the first classification and the second classification; and output the risk assessment and a signature representing the third plurality of files for remediation of the third plurality of files based on the risk assessment.

2. The computer readable medium of claim 1, wherein the third classification of the third plurality of files indicates a relative recovery value of the third plurality of files.

3. The computer readable medium of claim 1, wherein the instructions to calculate the risk assessment further include instructions that cause the one or more processors to:

determine that the second plurality of files are corrupt;

in response to determining that the second plurality of files are corrupt, identifying a fourth plurality of files corresponding to an indication of files stored on the user device at a second prior time; and calculating the risk assessment further based on classifications for each of the first plurality of files not included in the fourth plurality of files.

4. The computer readable medium of claim 3, wherein the second plurality of files are hosted by a first cloud storage service, and wherein the fourth plurality of files are hosted by a second cloud storage service.

5. A method for improving assessment of ransomware impact, comprising:

based on an identification of a ransomware attack, an indication of a first plurality of files stored on a user device, and a classification for each of the first plurality of files, determining a second plurality of files stored in a remote storage, wherein the second plurality of files corresponds to an indication of files stored on the user device at a first prior time, wherein each of the second plurality of files are associated with a second classification;

determining a third plurality of files including files included in the first plurality of files and not included in the second plurality of files;

calculating a risk assessment based on classifications for each of the third plurality of files, the third classification formed based on the first classification and the second classification; and outputting the risk assessment and a signature representing the third plurality of files for remediation of the third plurality of files based on the risk assessment.

6. The method of claim 5, wherein the third classification of the third plurality of files indicates a relative recovery value of the third plurality of files.

7. The method of claim 5, wherein calculating the risk assessment further includes:

determining that the second plurality of files are corrupt;

in response to determining that the second plurality of files are corrupt, identifying a fourth plurality of files corresponding to an indication of files stored on the user device at a second prior time; and calculating the risk assessment further based on classifications for each of the first plurality of files not included in the fourth plurality of files.

8. The method of claim 7, wherein the second plurality of files are hosted by a first cloud storage service, and wherein the fourth plurality of files are hosted by a second cloud storage service.

9. A system for assessing ransomware impact, comprising:

one or more processors; and a memory coupled to the one or more processors and including instructions executable by the one or more processors to cause the system to distribute software to at least:

based on an identification of a ransomware attack, an indication of a first plurality of files stored on a user device, and a classification for each of the first plurality of files, determine a second plurality of files stored in a remote storage, wherein the second plurality of files corresponds to an indication of files stored on the user device at a first prior time, wherein each of the second plurality of files are associated with a second classification;

determine a third plurality of files including files included in the first plurality of files and not included in the second plurality of files;

calculate a risk assessment based on classifications for each of the third plurality of files, the third classification formed based on the first classification and the second classification; and output the risk assessment and a signature representing the third plurality of files for remediation of the third plurality of files based on the risk assessment.

10. The system of claim 9, wherein the third classification of the third plurality of files indicates a relative recovery value of the third plurality of files.

11. The system of claim 9, wherein the instructions to calculate the risk assessment further include instructions that cause the system to:

determine that the second plurality of files are corrupt;

in response to determining that the second plurality of files are corrupt, identify a fourth plurality of files corresponding to an indication of files stored on the user device at a second prior time; and calculate the risk assessment further based on classifications for each of the first plurality of files not included in the fourth plurality of files.

12. The system of claim 11, wherein the second plurality of files are hosted by a first cloud storage service, and wherein the fourth plurality of files are hosted by a second cloud storage service.

13. A computer readable medium comprising instructions for improving risk assessment, executable by one or more processors to:

identify a first plurality of files stored in a user device at a first time;

determine a first value classification for each of the first plurality of files;

generate an indication of the first plurality of files at the first time, the indication including the first value classification and information regarding the first plurality of files to form a signature for remediation of malware with respect to the first plurality of files; and transmit, to a recovery server, the indication of the first plurality of files at the first time for backup storage.

14. The computer readable medium of claim 13, wherein the first value classification is based on a relative replacement value of each of the first plurality of files.

15. The computer readable medium of claim 13, wherein the value classification is based on a uniqueness of each of the first plurality of files.

16. The computer readable medium of claim 13, wherein the instructions to generate the indication of the first plurality of files at the first time includes instructions executable by the one or more processors to:

compress the first plurality of files; and store the compressed first plurality of files with a timestamp for the first time.

17. The computer readable medium of claim 13, wherein the instructions to determine the first value classification for each of the first plurality of files include instructions executable by the one or more processors to:
   assign the first value classification based on user behavior associated with each of the first plurality of files.

18. The computer readable medium of claim 13, wherein the instructions, when executed, further cause the one or more processors to provide one or more scenarios to view an impact of a ransomware attack on the first plurality of files via a user interface.

19. The computer readable medium of claim 13, further including instructions executable by one or processors to:
   request, from the recovery server, a risk assessment for current files stored on the user device; and
   receive the risk assessment from the recovery server, wherein the risk assessment indicates a determined value of current files stored on the user device that are not included in the first plurality of files based on a second value classification for each of the current files stored on the user device and not included in the first plurality of files.

20. The computer readable medium of claim 19, further including instructions executable by the one or more processors to:
   display a user interface by which user input is received to request the risk assessment for current files stored on the user device.

\* \* \* \* \*

UNITED STATES PATENT AND TRADEMARK OFFICE
CERTIFICATE OF CORRECTION

PATENT NO. : 10,318,743 B2  
APPLICATION NO. : 15/392848  
DATED : June 11, 2019  
INVENTOR(S) : Bidan Sinha et al.

Page 1 of 1

It is certified that error appears in the above-identified patent and that said Letters Patent is hereby corrected as shown below:

On the Title Page

Item [72], delete "Craig Schumgar" and insert -- Craig Schmugar --.

Signed and Sealed this  
Fifteenth Day of October, 2019

Andrei Iancu  
*Director of the United States Patent and Trademark Office*